(12) United States Patent
Hiraoka et al.

(10) Patent No.: US 11,967,468 B2
(45) Date of Patent: Apr. 23, 2024

(54) THIN FILM CAPACITOR AND MANUFACTURING METHOD THEREFOR

(71) Applicant: TDK CORPORATION, Tokyo (JP)

(72) Inventors: Masahiro Hiraoka, Tokyo (JP); Hitoshi Saita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 304 days.

(21) Appl. No.: 17/559,189

(22) Filed: Dec. 22, 2021

(65) Prior Publication Data

US 2022/0208477 A1 Jun. 30, 2022

(30) Foreign Application Priority Data

Dec. 25, 2020 (JP) ................. 2020-216643

(51) Int. Cl.
*H01G 4/33* (2006.01)
*H01G 4/008* (2006.01)
*H01G 4/012* (2006.01)
*H01G 4/10* (2006.01)

(52) U.S. Cl.
CPC ............. *H01G 4/33* (2013.01); *H01G 4/008* (2013.01); *H01G 4/012* (2013.01); *H01G 4/10* (2013.01)

(58) Field of Classification Search
CPC ......... H01G 4/008; H01G 4/012; H01G 4/10; H01G 4/33
See application file for complete search history.

(56) References Cited

FOREIGN PATENT DOCUMENTS

| JP | 50-21252 | 6/1973 |
| JP | 2002-026266 A | 1/2002 |

*Primary Examiner* — Nathan Milakovich
(74) *Attorney, Agent, or Firm* — YOUNG LAW FIRM, P.C.

(57) ABSTRACT

Disclosed herein is a thin film capacitor that includes a capacitive insulating film having first and second surfaces opposite to each other, a first capacitive electrode covering the first surface of the capacitive insulating film, and a second capacitive electrode covering the second surface of the capacitive insulating film. The first capacitive electrode is made of less noble metal having a lower spontaneous potential than a metal constituting the second capacitive electrode. A minute defective portion existing in the capacitive insulating film is closed by an insulator derived from a metal constituting the first capacitive electrode.

9 Claims, 5 Drawing Sheets

| Sample | Temperature | Humidity | Elapsed Time | Leak Current (A/cm$^2$) | |
|---|---|---|---|---|---|
| | | | | Initial Value | After Elapsed |
| 1 | 40°C | 85%RH | 1 hour | $3.2 \times 10^{-2}$ | $3.3 \times 10^{-2}$ |
| 2 | | | 5 hours | $2.8 \times 10^{-2}$ | $1.3 \times 10^{-3}$ |
| 3 | | | 12 hours | $3.1 \times 10^{-2}$ | $5.6 \times 10^{-4}$ |
| 4 | | | 24 hours | $2.5 \times 10^{-2}$ | $5.2 \times 10^{-5}$ |
| 5 | | | 72 hours | $3.8 \times 10^{-2}$ | $7.3 \times 10^{-6}$ |
| 6 | | | 144 hours | $3.1 \times 10^{-2}$ | $1.4 \times 10^{-7}$ |
| 7 | 60°C | | 1 hour | $2.1 \times 10^{-2}$ | $5.3 \times 10^{-2}$ |
| 8 | | | 5 hours | $3.3 \times 10^{-2}$ | $8.3 \times 10^{-3}$ |
| 9 | | | 12 hours | $3.2 \times 10^{-2}$ | $3.5 \times 10^{-5}$ |
| 10 | | | 24 hours | $3.7 \times 10^{-2}$ | $7.3 \times 10^{-6}$ |
| 11 | | | 72 hours | $2.8 \times 10^{-2}$ | $1.1 \times 10^{-7}$ |
| 12 | | | 144 hours | $2.9 \times 10^{-2}$ | $2.6 \times 10^{-8}$ |
| 13 | 85°C | | 1 hour | $3.5 \times 10^{-2}$ | $7.5 \times 10^{-2}$ |
| 14 | | | 5 hours | $2.5 \times 10^{-2}$ | $8.7 \times 10^{-4}$ |
| 15 | | | 12 hours | $2.9 \times 10^{-2}$ | $5.2 \times 10^{-5}$ |
| 16 | | | 24 hours | $3.1 \times 10^{-2}$ | $8.1 \times 10^{-6}$ |
| 17 | | | 72 hours | $2.6 \times 10^{-2}$ | $9.2 \times 10^{-7}$ |
| 18 | | | 144 hours | $3.1 \times 10^{-2}$ | $9.8 \times 10^{-8}$ |

FIG. 9

THIN FILM CAPACITOR AND MANUFACTURING METHOD THEREFOR

BACKGROUND OF THE INVENTION

Field of the Invention

The present invention relates to a thin film capacitor and a manufacturing method therefor and, more particularly, to a thin film capacitor in which a minute defective portion existing in a capacitive insulating film has been repaired and a manufacturing method therefor.

Description of Related Art

A power supply circuit board on which a switching element is mounted is mounted with a smoothing or snubber capacitor for stabilizing the power supply voltage by suppressing fluctuation therein, whereby voltage fluctuation generated in the power supply circuit and EMC noise generated therearound in association with the fluctuation are suppressed. As the smoothing or snubber capacitor, a multilayer ceramic chip capacitor is typically used.

In recent years, size reduction and high-frequency driving of power supply circuits are advancing, and along with this, circuit boards are reduced in size, so that the space for mounting the multilayer ceramic chip capacitor may become insufficient. Thus, in place of the multilayer ceramic chip capacitor, a thin film capacitor capable of being embedded in a circuit board is sometimes used.

JP 2002-026266A discloses a thin film capacitor in which a minute defective portion existing in a capacitive insulating film has been repaired. In this disclosure, a lower capacitive electrode exposed to a minute defective portion is oxidized by thermal oxidation, whereby the minute defective portion in the capacitive insulating film is repaired.

However, the technique of JP 2002-026266A involves thermal oxidation after the formation of the capacitive insulating film and before the formation of an upper capacitive electrode. It follows that the capacitive insulating film is exposed to the thermal oxidation and thus may be altered. Further, when the lower capacitive electrode is made of a material that is unlikely to be oxidized, the repair of the minute detective portion is difficult.

SUMMARY

It is therefore an object of the present invention is to repair the minute defective portion existing in the capacitive insulating film while preventing the capacitive insulating film from being exposed to thermal oxidation.

A thin film capacitor according to the present invention includes: a capacitive insulating film; a first capacitive electrode covering one surface of the capacitive insulating film; and a second capacitive electrode covering the other surface of the capacitive insulating film. The first capacitive electrode is made of less noble metal having a lower spontaneous potential than the metal constituting the second capacitive electrode, and a minute defective portion existing in the capacitive insulating film is closed by an insulator derived from the metal constituting the first capacitive electrode.

According to the present invention, the first capacitive electrode and the second capacitive electrode have mutually different spontaneous potentials, so that the minute defective portion can be repaired by galvanic corrosion. This eliminates the need of subjecting the capacitive insulating film to thermal oxidation. Further, even when the first capacitive electrode is made of a material that is unlikely to be oxidized, a leak current can be reduced.

In the present invention, the first capacitive electrode may include Al, and the insulator may include aluminum oxide. Alternatively, the first capacitive electrode may be made of an alloy including iron, and the insulator may include iron oxide. Thus, even when a metal material excellent in corrosion resistance is used for the first capacitive electrode, an insulator capable of closing the minute defective portion can be formed by galvanic corrosion.

In the present invention, assuming that the bottom width of the minute defective portion is L and that the maximum thickness of the insulator from the surface of the first capacitive electrode is t, the relation $0.1\ \text{nm} \leq t \leq L \times 2$ may be satisfied. This makes it possible to sufficiently reduce a leak current while reducing a time required to form the insulator.

In the present invention, a difference in spontaneous potential between the metal constating the first capacitive electrode and the metal constituting the second capacitive electrode may be 0.1 V or more and less than 1.1 V. This allows the galvanic corrosion to easily occur without using special metal.

A thin film capacitor manufacturing method according to the present invention includes: a first step of forming a capacitive insulating film on the surface of a lower capacitive electrode; a second step of forming an upper capacitive electrode on the surface of the capacitive insulating film; and a third step of closing a minute defective portion existing in the capacitive insulating film by an insulator derived from the metal constituting the lower capacitive electrode or upper capacitive electrode, utilizing galvanic corrosion.

According to the present invention, the galvanic corrosion is accelerated after the formation of the upper capacitive electrode, so that the minute defective portion existing in the capacitive insulating film can be repaired without subjecting the capacitive insulating film to thermal oxidation. Further, even when the lower capacitive electrode or upper capacitive electrode is made of a material that is unlikely to be oxidized, the insulator can be reliably formed.

In the third step, the galvanic corrosion may be accelerated by the supply of moisture, heat application, or voltage application between the lower capacitive electrode and the upper capacitive electrode. In particular, when a process is adopted, in which moisture is supplied, followed by the application of voltage between the lower capacitive electrode and the upper capacitive electrode while performing heating, a time required for repairing the minute defective portion can be significantly reduced.

According to the present invention, it is possible to repair the minute defective portion existing in the capacitive insulating film without subjecting the capacitive insulating film to thermal oxidation.

BRIEF DESCRIPTION OF THE DRAWINGS

The above features and advantages of the present disclosure will be more apparent from the following description of certain preferred embodiments taken in conjunction with the accompanying drawings, in which:

FIG. 9 is a table indicating a measurement result of examples.

DETAILED DESCRIPTION OF THE EMBODIMENTS

Preferred embodiments of the present invention will now be explained in detail with reference to the drawings.

Figure 1:
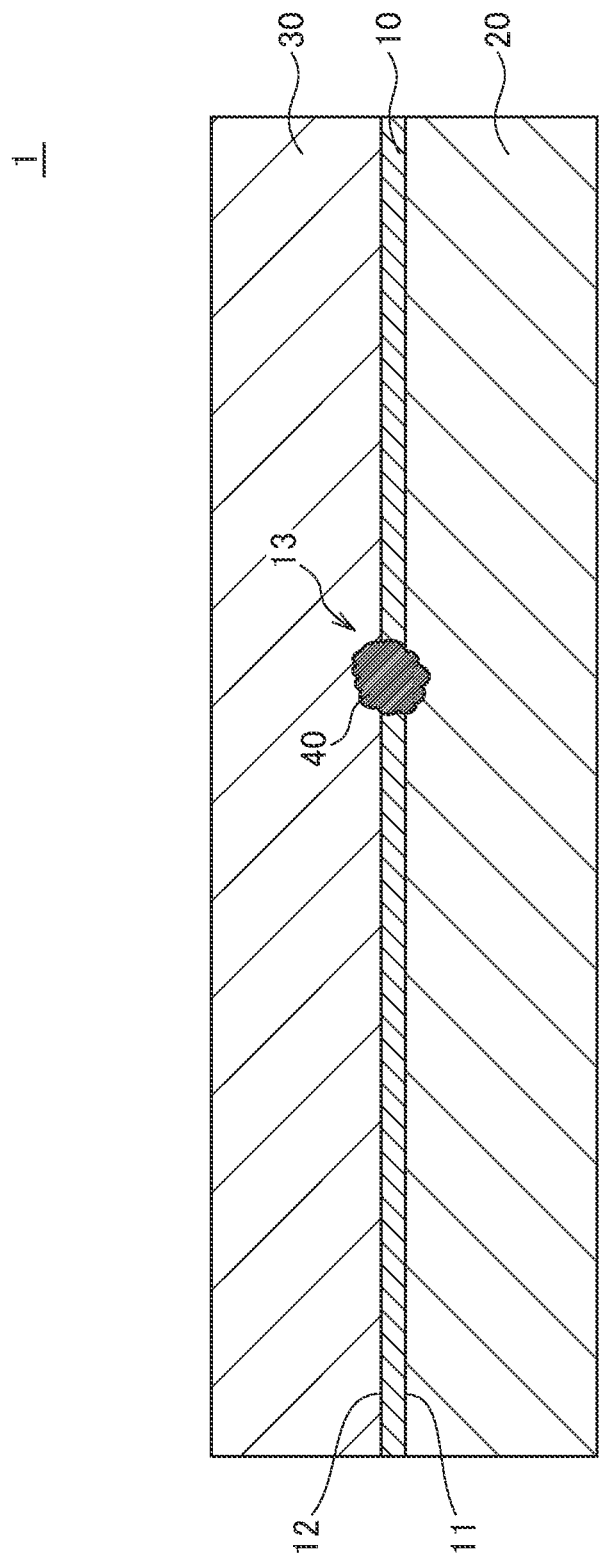
FIG. 1 is a schematic cross-sectional view for explaining the structure of a thin film capacitor 1 according to an embodiment of the present invention.

FIG. 1 is a schematic cross-sectional view for explaining the structure of a thin film capacitor 1 according to an embodiment of the present invention.

As illustrated in FIG. 1, the thin film capacitor 1 according to the present embodiment includes a capacitive insulating film 10, a lower capacitive electrode 20 covering one surface 11 of the capacitive insulating film 10, and an upper capacitive electrode 30 covering the other surface 12 of the capacitive insulating film 10. Examples of the material of the capacitive insulating film 10 include, but not limited thereto, $BaTiO_3$, $Ba(Mg_{1/3}Ta_{2/3})O_3$, NiO, CuO, $Al_2O_3$, $Fe_2O_3$, and $SiO_2$. The capacitive insulating film 10 includes a minute defective portion 13 inevitably formed during film deposition. The minute defective portion 13 is closed by an insulator 40 to be repaired.

The lower capacitive electrode 20 and the upper capacitive electrode 30 are made of metal materials having spontaneous potentials different from each other. Any combination of the metal constituting the lower capacitive electrode 20 and the metal constituting the upper capacitive electrode 30 is usable as long as their spontaneous potentials are mutually different. For example, Cu, Ni, Al, an Ni-based alloy (e.g., SUS304) containing Fe, and the like may be selected as the metal constituting the lower capacitive electrode 20, and Cu, Ni, Al, Ti, and the like may be selected as the metal constituting the upper capacitive electrode 30. A difference in spontaneous potential between the metal constituting the lower capacitive electrode 20 and the metal constituting the upper capacitive electrode 30 is preferably 0.1 V or more and less than 1.1 V.

The insulator 40 for repairing the minute defective portion 13 is made of an insulating material derived from the metal having a lower potential, i.e., less noble metal among the metals constituting the lower capacitive electrode 20 and upper capacitive electrode 30 and formed through galvanic corrosion. For example, when the lower capacitive electrode 20 is made of Al, and the upper capacitive electrode 30 is made of Cu, the insulator 40 is made of $Al_2O_3$ formed through galvanic corrosion of Al which is less noble metal than Cu. Since the spontaneous potentials of Al and Cu are −0.94 V and −0.36 V, respectively, a difference between the spontaneous potentials is 0.58 V. As another example, when the lower capacitive electrode 20 is made of SUS304, and the upper capacitive electrode 30 is made of Ti, the insulator 40 is made of $Fe_2O_3$ formed through galvanic corrosion of SUS304 which is less noble metal than Ti. Since the spontaneous potentials of SUS304 and Ti are −0.53 V and −0.10 V, respectively, a difference between the spontaneous potentials is 0.43 V.

Figure 2A:
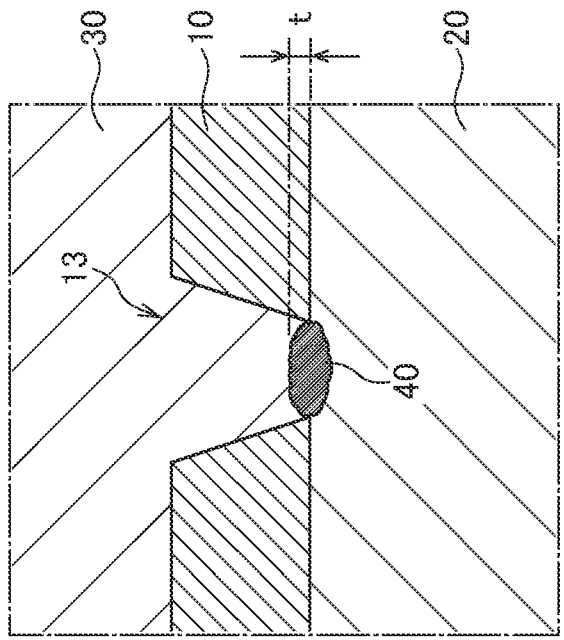
FIG. 2A is an enlarged view for explaining a definition of the bottom width L of the minute defective portion 13.
Figure 2B:
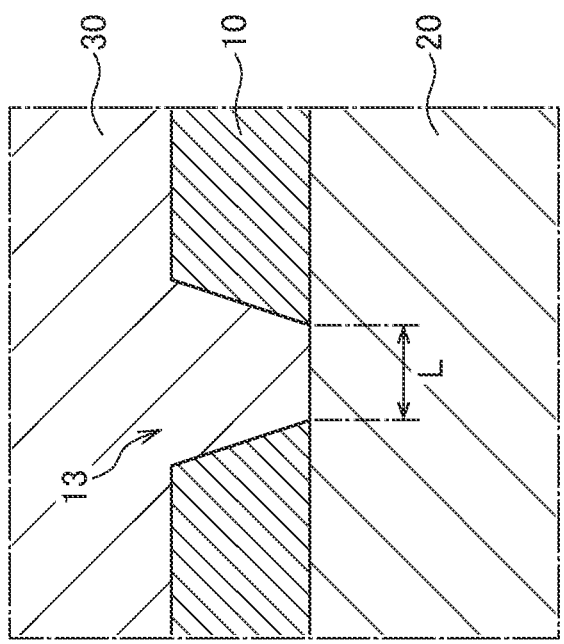
FIG. 2B is an enlarged view for explaining a definition of the maximum thickness t of the insulator 40.

Assume that the bottom width of the minute defective portion 13 is L as illustrated in FIG. 2A and that the maximum thickness of the insulator 40 from a surface 21 of the lower capacitive electrode 20 is t as illustrated in FIG. 2B. In this case, the relation 0.1 nm≤t≤L×2 is preferably satisfied. This is because that when the maximum thickness t of the insulator 40 is set to 0.1 nm or more, a leak current can be sufficiently reduced and that when the maximum thickness t of the insulator 40 is set to L×2 or less, a time required to form the insulator 40 can be reduced.

The following describes a manufacturing method for the thin film capacitor 1 according to the present embodiment.

FIGS. 3 to 8 are process views for explaining the manufacturing method for the thin film capacitor 1.

Figure 3:
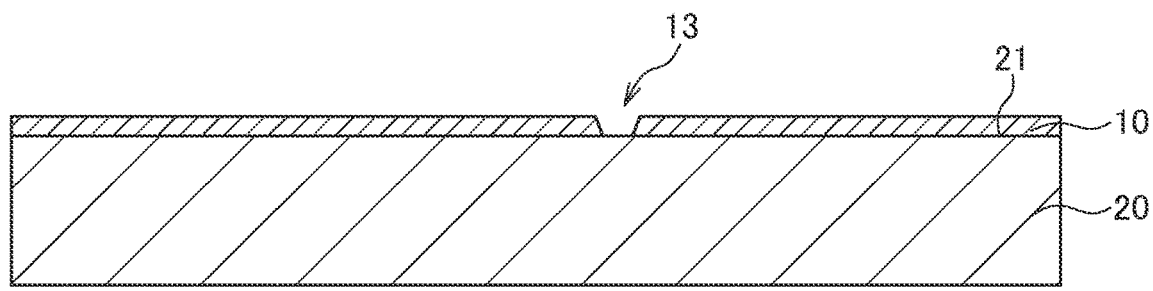
FIGS. 3 to 8 are process views for explaining the manufacturing method for the thin film capacitor 1.

First, as illustrated in FIG. 3, the capacitive insulating film 10 is deposited on the surface 21 of the lower capacitive electrode 20. Although not particularly limited, the capacitive insulating film 10 can be deposited by a thin film method such as ALD or sputtering or by oxidation of the lower capacitive electrode 20. For example, when the lower capacitive electrode 20 is made of Al, the surface 21 of the lower capacitive electrode 20 is subjected to natural oxidation or anodization, whereby the capacitive insulating film 10 made of $Al_2O_3$ can be deposited. Although it is ideal that the capacitive insulating film 10 has no defect, the minute defective portion 13 is actually inevitably formed. At the minute defective portion 13, the surface 21 of the lower capacitive electrode 20 is slightly exposed.

Figure 4:
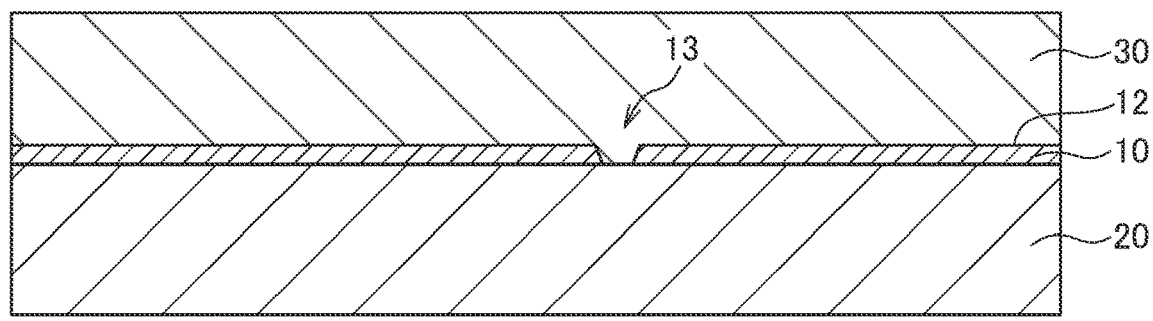

Then, as illustrated in FIG. 4, the upper capacitive electrode 30 is formed on the surface 12 of the capacitive insulating film 10. Although not particularly limited, the upper capacitive electrode 30 can be deposited by electrolytic plating, electroless plating, sputtering, or vapor deposition. The upper capacitive electrode 30 is formed also inside the minute defective portion 13 of the capacitive insulating film 10 and thus contacts the lower capacitive electrode 20 through the minute defective portion 13.

Figure 5:
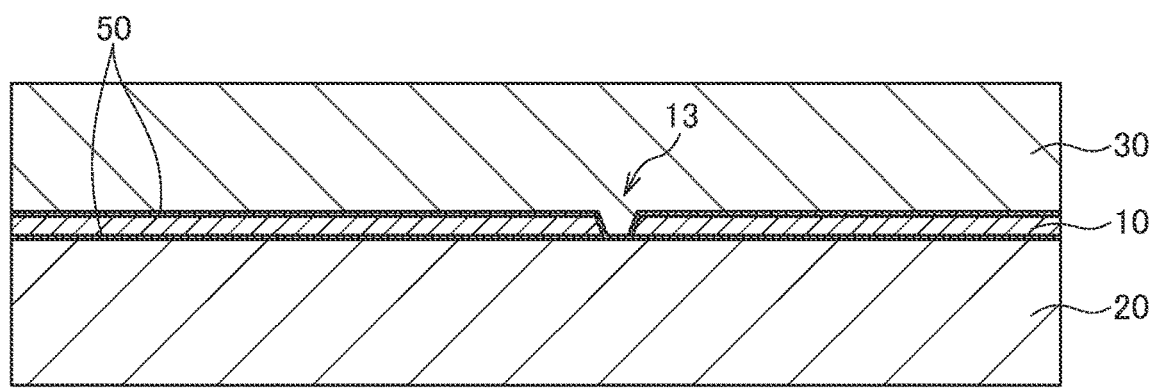
Figure 6:
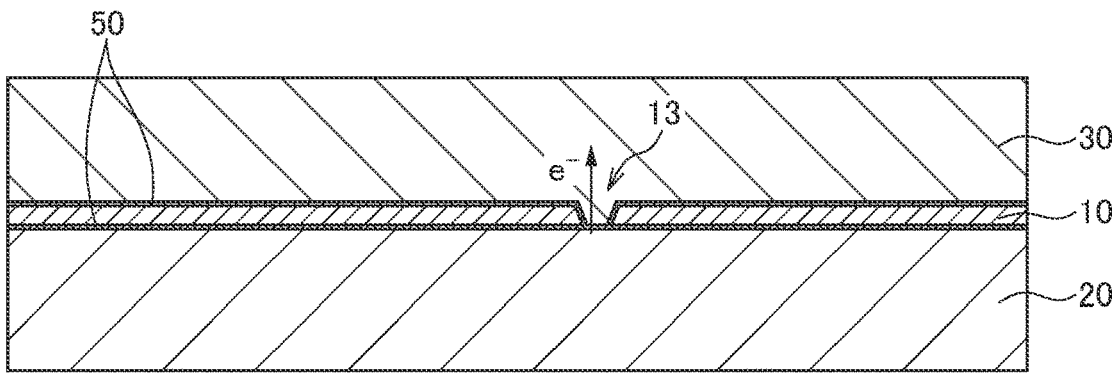

Then, as illustrated in FIG. 5, the thin film capacitor 1 is exposed in a high temperature and high humidity environment to supply moisture inside the thin film capacitor 1. That is, the thin film capacitor 1 is allowed to absorb moisture. Thus, moisture 50 exists at the interface between the capacitive insulating film 10 and the lower capacitive electrode 20 and the interface between the capacitive insulating film 10 and the upper capacitive electrode 30. In this state, a voltage is applied such that one of the lower capacitive electrode 20 and upper capacitive electrode 30 that is made of more noble metal is set as the positive side and the other one thereof that is made of less noble metal is set as the negative side. FIG. 6 illustrates a case where the lower capacitive electrode 20 and the upper capacitive electrode 30 are made of less noble metal and more noble metal, respectively. In this case, electrons $e^-$ move from the lower capacitive electrode 20 toward the upper capacitive electrode 30. Thus, when the lower capacitive electrode 20 is made of, e.g., Al, galvanic corrosion represented by $Al \rightarrow Al^{3+} + 3e^-$ is accelerated to generate $Al_2O_3$ at the interface between the lower capacitive electrode 20 and the upper capacitive electrode 30. When the lower capacitive electrode 20 is made of, e.g., SUS304, galvanic corrosion represented by $Fe \rightarrow Fe^{3+} + 3e^-$ is accelerated to generate $Fe_2O_3$ at the interface between the lower capacitive electrode 20 and the upper capacitive electrode 30. The above voltage application is performed while heating the thin film capacitor 1, whereby the galvanic corrosion is further accelerated. Further, the above voltage application is performed while continuously supplying moisture, whereby the galvanic corrosion is still further accelerated.

Figure 7:
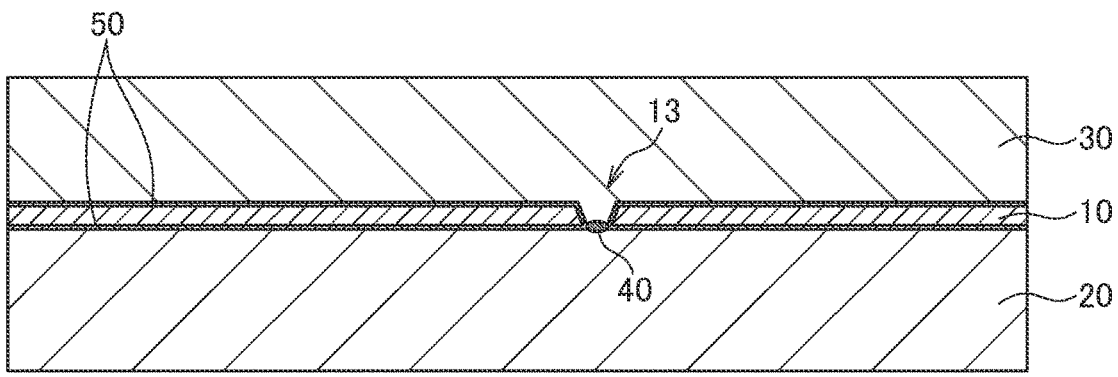
Figure 8:
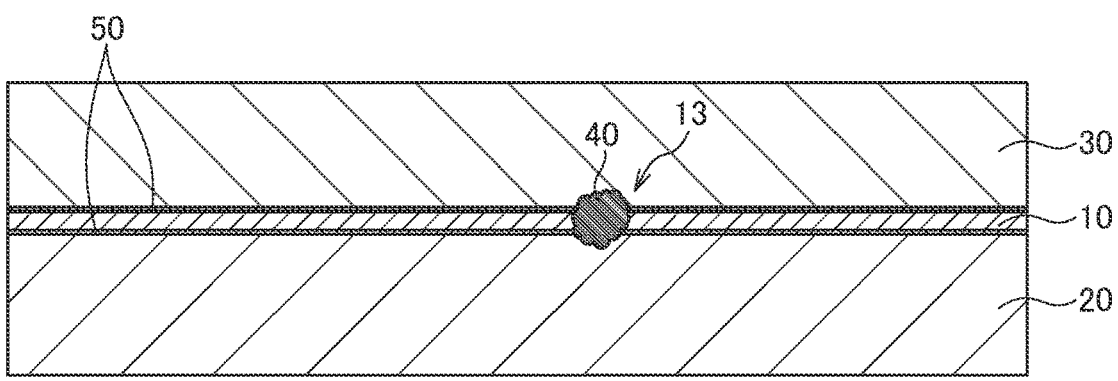

When the galvanic corrosion is thus accelerated, the insulator 40 derived from less noble metal with a low spontaneous potential is generated at the interface between the lower capacitive electrode 20 and the upper capacitive electrode 30, as illustrated in FIG. 7. As the corrosion proceeds, the insulator 40 is grown as illustrated in FIG. 8, and finally the minute defective portion 13 is closed by the insulator 40. This eliminates contact between the lower capacitive electrode 20 and the upper capacitive electrode 30 through the minute defective portion 13. Although the minute defective portion 13 need not be closed completely by the insulator 40, the galvanic corrosion is preferably allowed to proceed until a leak current becomes $10^{-5}$ A/cm$^2$ or less and more preferably until a leak current becomes $10^{-7}$ A/cm$^2$ or less. Another metal having smaller resistance value may further be formed on the surface of the upper capacitive electrode 30. For example, when the upper capacitive electrode 30 is made of Ti, a Cu film may be formed on the surface of the upper capacitive electrode 30.

As described above, in the present embodiment, the galvanic corrosion is accelerated after the upper capacitive electrode 30 is formed on the capacitive insulating film 10, so that the minute defective portion 13, if any, in the capacitive insulating film 10, can be repaired by the insulator 40 derived from less noble metal.

When the insulator 40 is to be formed before the formation of the upper capacitive electrode 30 by thermal oxidation as in the method described in JP 2002-26266A, the lower capacitive electrode 20, if it is made of Al, the capacitive insulating film 10 made of Al$_2$O$_3$ increases in thickness, thus failing to obtain a designed capacitance. Further, when the lower capacitive electrode 20 is made of SUS304, SUS304 is hardly oxidized, thus failing to obtain a sufficient amount of the insulator 40. On the other hand, in the present embodiment, the galvanic corrosion is utilized to form the insulator 40 after the formation of the upper capacitive electrode 30, so that it is possible to reliably repair the minute defective portion 13 while achieving a designed capacitance.

While the preferred embodiment of the present invention has been described, the present invention is not limited to the above embodiment, and various modifications may be made within the scope of the present invention, and all such modifications are included in the present invention.

EXAMPLES

The capacitive insulating film 10 made of Al$_2$O$_3$ and having a thickness of 10 nm was deposited by ALD on the surface of the lower capacitive electrode 20 made of Al and having a thickness of 1 μm. Further, the upper capacitive electrode 30 made of Cu and having a thickness of 1 μm was deposited by sputtering on the surface of the capacitive insulating film 10. Then, the upper capacitive electrode 30 was patterned into a square of 5 mm×5 mm so as to allow for evaluation of the insulation resistance of the thin film capacitor 1.

A plurality of such samples were prepared, and the position of the minute defective portion 13 was identified using an IR-OBIRCH analyzer. After that, a 2 V DC bias voltage was applied with the upper capacitive electrode 30 and the lower capacitive electrode 20 set as the positive side and the negative side, respectively, to measure a leak current. Then, the samples were left for 1 to 144 hours under a high temperature and high humidity environment shown in FIG. 9 while being applied with a 2 V DC bias voltage to allow the galvanic corrosion to proceed. After the elapse of a predetermined period of time, the samples were taken out, followed by the application of 2 V DC bias voltage again to measure a leak current.

As a result, as shown in FIG. 9, the leak current was in the range of $2\times10^{-2}$ A/cm$_2$ to $4\times10^{-2}$ A/cm$_2$ for all the samples in an initial state, while the longer the time during which the samples were left under a high temperature and high humidity environment, the more the leak current decreased. Specifically, under an environment of 40° C. and 85% RH, the leak current was $10^{-5}$ A/cm$^2$ or less after leaving the samples for 72 hours or longer; under an environment of 60° C. or 80° C. and 85% RH, the leak current was $10^{-5}$ A/cm$^2$ or less after leaving the samples for 24 hours or longer; and under an environment of 60° C. or 80° C. and 85% RH, the leak current was $10^{-7}$ A/cm$^2$ or less after leaving the samples for 144 hours or longer.

Then, the cross section of the minute defective portion 13 of each sample was observed using an FIB-SEM, and a bottom width L of the minute defective portion 13 and a maximum thickness t of the insulator 40 positioned in the same layer as the capacitive insulating film 10 were measured. As a result, all the samples having a leak current of $10^{-5}$ A/cm$^2$ or less satisfied the relation $0.1$ nm$\leq t\leq L\times 2$.

What is claimed is:

1. A thin film capacitor comprising:
   a capacitive insulating film having first and second surfaces opposite to each other;
   a first capacitive electrode covering the first surface of the capacitive insulating film; and
   a second capacitive electrode covering the second surface of the capacitive insulating film,
   wherein the first capacitive electrode is made of less noble metal having a lower spontaneous potential than a metal constituting the second capacitive electrode, and
   wherein a minute defective portion existing in the capacitive insulating film is closed by an insulator derived from a metal constituting the first capacitive electrode.

2. The thin film capacitor as claimed in claim 1,
   wherein the first capacitive electrode includes Al, and
   wherein the insulator includes aluminum oxide.

3. The thin film capacitor as claimed in claim 1,
   wherein the first capacitive electrode is made of an alloy including iron, and
   wherein the insulator includes iron oxide.

4. The thin film capacitor as claimed in claim 1, wherein, assuming that a bottom width of the minute defective portion is L and that a maximum thickness of the insulator from a surface of the first capacitive electrode is t, a relation $0.1$ nm$\leq t\leq L\times 2$ is satisfied.

5. The thin film capacitor as claimed in claim 1, wherein a difference in spontaneous potential between the metal constating the first capacitive electrode and the metal constituting the second capacitive electrode is 0.1 V or more and less than 1.1 V.

6. A method for manufacturing a thin film capacitor, the method comprising:
   forming a capacitive insulating film on a surface of a lower capacitive electrode;
   forming an upper capacitive electrode on a surface of the capacitive insulating film; and
   closing a minute defective portion existing in the capacitive insulating film by an insulator derived from a metal constituting the lower capacitive electrode or upper capacitive electrode, utilizing galvanic corrosion.

7. The method for manufacturing a thin film capacitor as claimed in claim 6, wherein, in the closing, the galvanic corrosion is accelerated by a supply of moisture.

8. The method for manufacturing a thin film capacitor as claimed in claim 6, wherein, in the closing, the galvanic corrosion is accelerated by a heat application.

9. The method for manufacturing a thin film capacitor as claimed in claim 6, wherein, in the closing, the galvanic corrosion is accelerated by a voltage application between the lower capacitive electrode and the upper capacitive electrode.

\* \* \* \* \*